United States Patent
Lewis et al.

(10) Patent No.: US 12,486,444 B2
(45) Date of Patent: Dec. 2, 2025

(54) SYNERGISTIC PERFORMANCE OF AMINE BLENDS IN SHALE CONTROL

(71) Applicant: Huntsman Petrochemical LLC, The Woodlands, TX (US)

(72) Inventors: David C. Lewis, The Woodlands, TX (US); John Clements, The Woodlands, TX (US); James Machac, The Woodlands, TX (US)

(73) Assignee: HUNTSMAN PETROCHEMICAL LLC

(*) Notice: Subject to any disclaimer, the term of this patent is extended or adjusted under 35 U.S.C. 154(b) by 1017 days.

(21) Appl. No.: 17/619,160

(22) PCT Filed: May 14, 2020

(86) PCT No.: PCT/US2020/032887
§ 371 (c)(1),
(2) Date: Dec. 14, 2021

(87) PCT Pub. No.: WO2020/256863
PCT Pub. Date: Dec. 24, 2020

(65) Prior Publication Data
US 2022/0243112 A1    Aug. 4, 2022

Related U.S. Application Data

(60) Provisional application No. 62/863,326, filed on Jun. 19, 2019.

(51) Int. Cl.
*C09K 8/18*    (2006.01)

(52) U.S. Cl.
CPC ............ *C09K 8/18* (2013.01); *C09K 2208/18* (2013.01)

(58) Field of Classification Search
CPC ........ C09K 8/18; C09K 2208/18; C09K 8/58; C09K 8/04; C09K 2208/12
See application file for complete search history.

(56) References Cited

U.S. PATENT DOCUMENTS

| | | | |
|---|---|---|---|
| 5,817,615 A * | 10/1998 | Garabedian, Jr. | C11D 1/75 510/237 |
| 6,247,543 B1 | 6/2001 | Patel et al. | |
| 7,012,043 B2 | 3/2006 | Klein et al. | |
| 9,175,036 B2 | 11/2015 | Kasher et al. | |
| 2007/0173414 A1 | 7/2007 | Wilson, Jr. | |
| 2017/0145282 A1 | 5/2017 | Shumway et al. | |
| 2017/0306210 A1 * | 10/2017 | Pakulski | C09K 8/52 |

FOREIGN PATENT DOCUMENTS

| | | |
|---|---|---|
| CA | 3046407 A1 | 6/2018 |
| WO | 1998/055733 A1 | 12/1998 |
| WO | WO-9855733 A1 * | 12/1998 ............. C09K 8/607 |

OTHER PUBLICATIONS

International Search Report and Written Opinion received in corresponding PCT Application PCT/US2020/032887 completed Sep. 7, 2020 and mailed Sep. 30, 2020.
Office Action issued on Jun. 4, 2024, in corresponding Brazilian Patent Application No. 11 2021 025646 6 (Machine Translation in English enclosed herewith).

* cited by examiner

*Primary Examiner* — Alicia Bland

(57) ABSTRACT

The present disclosure provides water-based well treatment fluids methods of using such fluids in treating subterranean formations to prevent swelling and/or migration of fines. The water-based well treatment fluid contains an aqueous continuous phase and a clay stabilizing agent comprising less than 20% by weight, based on the total weight of the clay stabilizing agent, of an unhindered primary amine and a second amine selected from an alkanolamine, a polyalkylene polyamine, a compound having a formula $R_4$—$(CH_2)_d$—$NH_2$ where $R_4$ is a piperazino group or a morpholino group and d is an integer from 0 to 10, a compound having the formula where h is an integer from about 2 to about 7 and a mixture thereof.

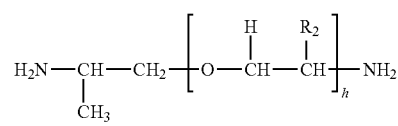

8 Claims, No Drawings

SYNERGISTIC PERFORMANCE OF AMINE BLENDS IN SHALE CONTROL

CROSS-REFERENCE TO RELATED APPLICATION

This application is the National Phase of International Application PCT/US2020/032887 filed May 14, 2020 which designated the U.S. and which claims priority to U.S. Provisional App. 62/863,326 filed Jun. 19, 2019. The noted applications are incorporated herein by reference.

STATEMENT REGARDING FEDERALLY SPONSORED RESEARCH OR DEVELOPMENT

Not applicable.

FIELD

The present disclosure generally relates to water-based well treatment fluids and their use. More specifically, the present disclosure relates to a mixture of an unhindered primary amine and a second amine as a clay stabilizing agent in water-based well treatment fluids and methods of using the same.

BACKGROUND

The production of hydrocarbons from subterranean formations is often effected by the presence of clays and other fines which can migrate and plug off or restrict the flow of the hydrocarbon product. The migration of fines in a subterranean formation is often the result of clay swelling, salt dissolution, and/or the disturbance of fines by the introduction of fluids that are foreign to the formation. Typically, such foreign fluids (for e.g. drilling fluid, fracturing fluid or stabilizing fluid) are introduced into the formation for the purpose of completing and/or treating the formation to stimulate production of hydrocarbons by, for example, drilling, fracturing, acidizing, or stabilizing the well.

Attempts to diminish the damaging effects caused by introduction of the foreign fluid and the swelling and migration of the components of the formations has included the addition of one or more various shale hydration inhibitors and/or stabilizing agents into such foreign fluids. These work on the principle of the substitution of a cationic species in the clay lattice for a sodium ion. The cationic species is generally selected such that its radius of hydration is less than that of the sodium ion. It is believed that the molecules of the shale hydration inhibitors and stabilizing agents compete with molecules of water for reactive sites. Thus, the possibility of swelling and migration is minimized upon their contact with the formation. As a result, the probability of disintegration of formation is diminished and swelling is inhibited.

Potassium chloride has been widely used as a shale inhibitor/clay stabilizer. In stimulation methods, potassium chloride has often been used as a preflush and/or added to aqueous stimulation methods in order to convert the clay to a less swellable form. While such salts diminish the reduction of formation permeability, they are often detrimental to the performance of other constituents of the foreign fluid. For example, high concentration of such salts is typically required for stabilization of clay (typically 6%). Such salts further produce high chloride levels which are environmentally unacceptable. Other known shale hydration inhibitors/clay stabilizing agents, which have been used include, for example:

WO 98/55733 which discloses the use of at least one organic amine selected from a primary diamine with a chain length of less than 8 carbon atoms and a primary alkyl amine with a chain length of less than 4 carbon atoms;

WO 05/058986 which teaches the use of an amine salt of an imide of a maleic anhydride polymer;

WO 06/013595 which discloses adducts of carboxymethyl cellulose and an organic amine as solid shale inhibitors;

WO 06/013597 which teaches the use of 0.2-5% by wt. of 1,2-diaminocyclohexane to inhibit the swelling of clay;

WO 06/136031 which teaches the use of amine salts having different molecular weights so as to be able to transport into micropore, mesospore and macrospores in the formation and effect cationic exchange therein;

WO 10/040223 which discloses the use of bis-surfactant diamine compounds to reduce clay swelling while drilling is carried out;

U.S. Pat. No. 4,719,021 which teaches incorporating a polyvalent metal/guanidine complex into a drilling fluid to stabilize colloidal clay;

U.S. Pat. Nos. 6,831,043 and 6,857,485 which teach the use of polyether amines as shale hydration inhibition agents;

U.S. Pat. No. 7,192,907 which discloses quaternary compounds as shale encapsulating agents to at least partially inhibit swelling and aid in the action of conventional shale inhibitors;

U.S. Pat. No. 7,514,392 which teaches the use of bis-cyclohexylamine derivatives as shale hydration inhibitors;

U.S. Pat. No. 7,939,473 which discloses monoquaternary hydroxyalkylalkylamines or poly(trihydroxyalklyalkylquaternary amines) as additives for reducing the swelling of clay in wells;

U.S. Pat. No. 8,026,198 which teaches the use of propylamine derivatives, hydrogenated poly (propyleneimine) dendrimers and polyamine twin dendrimers as shale hydration inhibitors;

U.S. Pat. No. 9,574,126 which teaches the use of glycol ether amines as clay shale inhibitors;

U.S. Pat. No. 9,719,007 which discloses an aqueous composition comprising a clay inhibitor consisting of a compound of the formula $R_1$—NH—R—$(OR)_x$—NH—$R_1$ where R is ethyl or propyl and $R_1$ is a $C_1$-$C_6$ alkyl group and weighting material;

U.S. Pat. Appl. Publ. No. 2016/0208158 which discloses a water based drilling fluid containing 45-95% by weight of triethylenetetramine and 5-50% by weight of aminoethylpiperazine; and U.S. Pat. Appl. Publ. No. US 2017/0145282 which discloses a clay stabilizer having the formula Y—$R^1$—(O—$R^2$)$_x$—Y where $R^1$ and $R^2$ are substituted or unsubstituted $C_1$-$C_{20}$ hydrocarbylene groups and at least one Y has to be a substituted amino group, a substituted or unsubstituted ammonium group, a substituted or unsubstituted amine oxide group or a nitro group.

There is a continuing need for the development of improved shale hydration inhibitors/clay stabilizing agents which pose little threat to the environment by eliminating substantially all chlorides, and are as at least as effective as the most effective prior art shale hydration inhibitor/clay stabilizing agents.

SUMMARY

The present disclosure provides a water-based well treatment fluid which is capable of being used in a downhole fluid that is introduced into a subterranean formation containing clay subterranean materials, such subterranean materials having a tendency to exhibit swelling and/or migration upon exposure to water. The water-based well treatment fluid generally contains an aqueous continuous phase, a clay stabilizing agent including less than 20% by weight of an unhindered primary amine and a second amine.

According to another embodiment, there is provided a method of inhibiting swelling and/or migration of clay subterranean materials encountered during the drilling of a subterranean formation. The method includes circulating in the subterranean formation the water-based well treatment fluid of the present disclosure.

In yet another embodiment, there is provided a method of extracting oil from an oil containing subterranean formation including the steps of providing through a first borehole, a pressurized water-based well treatment fluid of the present disclosure and recovering oil from the subterranean formation through a second borehole.

In still yet another embodiment, there is provided a system comprising a subterranean formation and the water-based well treatment fluid of the present disclosure.

DETAILED DESCRIPTION

The present disclosure is generally directed to a water-based well treatment fluid for use in the treatment of a subterranean formation comprising: (i) an aqueous continuous phase; and (ii) a clay stabilizing agent including (a) less than 20% by weight, based on the total weight of the clay stabilizing agent, of an unhindered primary amine and (b) a second amine. It has been surprisingly found that this particular mixture of amines provide performances as clay/shale inhibitors that are notably better than that predicted from a weighted average of the performances of the individual amines.

The following terms shall have the following meanings:

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The term "unhindered primary amine" means a compound in which the carbon atom(s) adjacent to the nitrogen of the primary amine group(s) has only hydrogen atoms attached thereto.

The articles "a" and "an" are used herein to refer to one or to more than one (i.e. to at least one) of the grammatical objects of the article. By way of example, "an unhindered primary amine" means one unhindered primary amine or more than one unhindered primary amine. The phrases "in one embodiment", "according to one embodiment" and the like generally mean the particular feature, structure, or characteristic following the phrase is included in at least one embodiment of the present disclosure, and may be included in more than one embodiment of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "substantially free" refers to a composition in which a particular compound or moiety is present in an amount that has no material effect on the composition. In some embodiments, "substantially free" may refer to a composition in which the particular compound or moiety is present in the composition in an amount of less than 2% by weight, or less than 1% by weight, or less than 0.5% by weight, or less than 0.1% by weight, or less than 0.05% by weight, or even less than 0.01% by weight based on the total weight of the composition, or that no amount of that particular compound or moiety is present in the respective composition.

Where substituent groups are specified by their conventional chemical formula, written from left to right, they equally encompass the chemically identical substituents that would result from writing the structure from right to left, for example, —$CH_2O$— is equivalent to —$OCH_2$—.

The term "aliphatic" or "aliphatic group", as used herein, denotes a hydrocarbon moiety that is straight-chained (i.e., unbranched) or cyclic (including fused, bridging, and spiro-fused polycyclic) and may be completely saturated or may contain one or more units of unsaturation, but which is not aromatic.

The term "aqueous continuous phase" as used herein refers to a liquid medium composed largely, but not necessarily exclusively, of water, such as at least 50% by weight of water, or at least 60% by weight of water, or at least 70% by weight of water, or at least 80% by weight of water, or at least 90% by weight of water or at least 95% by weight of water. Other components may be present, such as salts, co-solvents, buffers, etc.

The phrase "subterranean formation" encompasses both areas below exposed earth and areas below earth covered by water, such as an ocean or fresh water. The term "clay subterranean materials" includes sand and/or clays which swell, disperse, disintegrate or otherwise become disrupted, thereby demonstrating an increase in bulk volume, in the presence of foreign aqueous well treatment fluids, such as drilling fluids, stimulation fluids, gravel packing fluids, etc. The term also includes those sand and/or clays which disperse, disintegrate or otherwise become disrupted without actual swelling. For example, clays which, in the presence of foreign aqueous well treatment fluids, expand and may be disrupted by becoming unconsolidated, thereby producing particles that migrate into a borehole shall also be included by the term.

The term "optional" or "optionally" means that the subsequently described event or circumstance may or may not occur, and that the description includes instances where said event or circumstance occurs and instances where it does not.

According to various embodiments, the clay stabilizing agent of the present disclosure may comprise, consist essentially of or consist of a synergistic mixture of amines which can be used in water-based well treatment fluids. In particular, the mixture of amines performs significantly better than that predicted from a weighted average of the performances of the individual amines.

Additionally, the water-based well treatment fluid containing the clay stabilizing agent is capable of reducing or substantially eliminating damage to a subterranean formation caused by swellable and/or migrating clay subterranean materials. The presence of the clay stabilizing agent eliminates or reduces the tendency of the clay subterranean materials to swell and/or disintegrate/migrate upon contact with the water-based well treatment fluid. Such inhibition and/or migration may be temporary or substantially permanent depending on the quantity of water-based well treatment fluid used to treat the subterranean formation. Thus, another advantage of using the disclosed clay stabilizing agent is evidenced by its ability to provide permanent clay stabilization. Temporary clay stabilizers are materials that protect the subterranean formation only during treatment of the formation with the water-based well treatment fluid. Migration of natural fluids over the subterranean formation over time displaces foreign cations, thereby reverting the clay back to its natural swelling form. In contrast, permanent clay stabilizers minimize such swelling when the clays are exposed to natural fluids over time without the need of continued addition of the water-based well treatment fluid.

In addition to inhibiting swelling and/or migration, the clay stabilizing agents disclosed herein also achieve other benefits. For instance, the clay stabilizing agents may be thermally stable, toxicologically safer, and have better handling properties. Therefore, the clay stabilizing agents may be broadly utilized in land based drilling operations as well as offshore drilling operations.

Thus, according to one embodiment, there is provided a water-based well treatment fluid for treatment of a subterranean formation comprising:

(A) an aqueous continuous phase and
(B) a clay stabilizing agent including:
  (a) about 0.001% by weight to about 20% by weight, based on the total weight of the clay stabilizing agent, of an unhindered primary amine selected from: (i) a compound having a formula

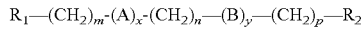

where $R_1$ and $R_2$ independently are $—NH_2$ or methyl with the proviso that at least one of $R_1$ or $R_2$ is $—NH_2$; A and B independently are chosen from an ethylene oxide, propylene oxide and butylene oxide group; m, n, and p independently are an integer ranging from 0 to 10 with the proviso that m+n+p is at least 1; and x and y independently are an integer from 0 or 5 with the proviso that x+y is at least 1; (ii) a compound having a molecular weight of less than 600 g/mole and a formula:

where $R_3$ is an aliphatic group having at least 4 carbon atoms to 30 carbon atoms and a is 2 or 3; and (iii) a mixture thereof and
  (b) a second amine selected from: (i) an alkanolamine; (ii) a polyalkyleneamine selected from a polyethyleneamine, a polypropyleneamine and a mixture thereof; (iii) a compound having a formula $R_4—(CH_2)_d—NH_2$ where $R_4$ is a piperazino group or a morpholino group and d is an integer from 0 to 10; (iv) a compound having the formula

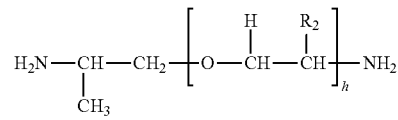

where h is an integer from about 2 to about 7; and (v) a mixture thereof. In one particular embodiment, the composition is substantially free of a quaternary amine.

The water-based well treatment fluid may be any fluid capable of delivering the clay stabilizing agent into a subterranean formation. Thus, in one embodiment, the water-based well treatment fluid is a drilling fluid, a drill-in-fluid, a stimulation fluid, a fracturing fluid, an acidizing fluid, a remedial fluid, a well reworking fluid or a gravel pack fluid.

The aqueous continuous phase may be any water based fluid phase that is compatible with the formulation of the water-based well treatment fluid and is also compatible with the clay stabilizing agents disclosed herein. In one embodiment, the aqueous continuous phase is selected from fresh water, sea water, brine, a mixture of water and a water soluble organic compound and mixtures thereof. The amount of the aqueous continuous phase should be sufficient to form a water-based well treatment fluid. In one embodiment, the amount of the aqueous continuous phase may range from nearly 100% of the water-based well treatment fluid by volume to less than 30% of the water-based well treatment fluid by volume. In another embodiment, the amount of the aqueous continuous phase is from about 95% by volume to about 30% by volume of the water-based well treatment fluid. In still another embodiment, the amount of the aqueous continuous phase is from about 90% by volume to about 40% by volume of the water-based well treatment fluid.

As discussed above, the water-based well treatment fluid also includes a clay stabilizing agent which is a mixture of an unhindered primary amine and a second amine. In one embodiment, the unhindered primary amine is the compound having the formula

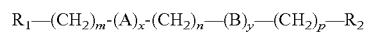

where $R_1$ is methyl; $R_2$ is $—NH_2$; A and B are ethylene oxide or propylene oxide; m, n and p independently are integers from 0 to 10 with the proviso that m+n+p is at least 1; and x and y independently are integers from 0 to 5 with the proviso that x+y is at least 1. In another embodiment, $R_1$ is methyl; $R_2$ is —$NH_2$; A and B are ethylene oxide; m, n and p independently are integers from 0 to 5 with the proviso that m+n+p is at least 1; and x and y independently are integers from 0 to 3 with the proviso that x+y is at least 1. In still yet another embodiment, $R_1$ is methyl; $R_2$ is —$NH_2$; A and B are ethylene oxide; m, n and p independently are 0 or 1 with the proviso that m+n+p is at least 1; and x and y independently are 0 or 1 with the proviso that x+y is at least 1.

In another embodiment, the unhindered primary amine is the compound having the formula

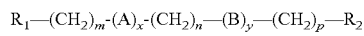

$$R_1—(CH_2)_m\text{-}(A)_x—(CH_2)_n—(B)_y—(CH_2)_p—R_2$$

where $R_1$ is —$NH_2$; $R_2$ is —$NH_2$; A and B are ethylene oxide or propylene oxide; m, n and p independently are integers from 0 to 10 with the proviso that m+n+p is at least 1; and x and y independently are integers from 0 to 5 with the proviso that x+y is at least 1. In another embodiment, $R_1$ is —$NH_2$; $R_2$ is —$NH_2$; A and B are ethylene oxide; m, n and p independently are integers from 0 to 5 with the proviso that m+n+p is at least 1; and x and y independently are integers from 0 to 3 with the proviso that x+y is at least 1. In still yet another embodiment, $R_1$ is —$NH_2$; $R_2$ is —$NH_2$; A and B are ethylene oxide; m, n and p independently are 0 or 1 with the proviso that m+n+p is at least 1; and x and y independently are 0 or 1 with the proviso that x+y is at least 1.

According to another embodiment, the unhindered primary amine is the compound having the formula $R_3$—$(NH_2)_a$ where $R_3$ is an aliphatic group having from 4 to 20 carbon atoms. Examples include, but are not limited to, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 2,2,4-trimethylhexamethylenediamine, 2,4,4-trimethylhexamethylenediamine, tetramethylenediamine, 1,2,3-triaminopropane, triaminohexane, triaminononane, triaminododecane, 1,8-diamino-4-aminomethyloctane, 1,3,6-triaminohexane, 1,6,11-triaminoundecane, 3-aminomethyl-1,6-diaminohexane, diaminocyclobutane, isophoronediamine, 1,2-diaminocyclohexane, 1,3-diaminocyclohexane, 1,4-diaminocyclohexane, 1,3-bis(aminomethyl) cyclohexane, 1,4-bis(aminomethyl) cyclohexane, 4,4'-methylenebis(cyclohexyl amine), 2,5-bis(aminomethyl) bicyclo[2,2,1]heptane, 2,6-bis(aminomethyl) bicyclo[2,2,1]heptane, hydrogenated 2,4-tolylenediamine, hydrogenated 2,6-tolylenediamine, triaminocyclohexane and mixtures thereof.

According to another embodiment, the second amine is an alkanolamine. The alkanolamine may be a monoalkanolamine, which in some embodiments contains from 2 to 20 carbon atoms including ethanolamine, propanolamine, butanolamine, pentanolamine, hexanolamine, heptanolamine, octanolamine, nonanolamine, decanolamine, undecanolamine, dodecanolamine, tridecanolamine, tetradecanolamine, pentadecanolamine, hexadecanolamine, heptadecanolamine, octadecanolamine, nonadecanolamine, eicosanolamine and in further embodiments these alkanolamines may have one or both of the amino hydrogens replaced by an alkyl group, the alkyl group containing from 1 to 20 carbon atoms. Such substituted alkanolamines include N-methyl-ethanolamine, N-ethyl-ethanol amine, N-propyl-ethanolamine, N-butyl-ethanolamine, N-pentyl-ethanolamine, N-hexyl-ethanolamine, N-heptylethanolamine, N-octyl-ethanolamine, N-nonyl-ethanolamine, N-decyl-ethanolamine, N-undecyl-ethanolamine, N-dodecylethanolamine, N-tridecyl-ethanolamine, N-tetradecyl-ethanolamine, N-pentadecyl-ethanolamine, N-hexadecyl-ethanolamine, N-heptadecyl-ethanolamine, N-octadecyl-ethanolamine, N-nonadecyl-ethanolamine, N-eicosyl-ethanolamine, N,Ndimethylethanolamine, N,N-diethyl-ethanolamine, N,N-dipropyl-ethanolamine, N,N-dibutyl-ethanolamine, N,N-dipentyl-ethanolamine, N,N-dihexyl-ethanolamine, N,Ndiheptyl-ethanol amine, N,N-dioctyl-ethanolamine, N,N-dinonyl-ethanolamine, N,N-didecyl-ethanolamine, N,N-diundecyl-ethanolamine, N,N-didodecylethanolamine, N,N-ditridecyl-ethanolamine, N,N-ditetradecylethanolamine, N,N-dipentadecyl-ethanolamine, N,N-dihexadecylethanolamine, N,Ndiheptadecyl-ethanolamine, N,N-dioctadecyl-ethanolamine, N,N-dinonadecyl-ethanolamine and N,N-dieicosylethanolamine. It is understood that the substitution may also comprise cycloalkyl, such as cyclohexyl.

In another embodiment, the second amine is an alkanolamine containing at least two hydroxyl groups and one amino group or an alkanolamine containing at least one hydroxyl group and two amino groups. The embodiment in which the alkanolamine contains at least two hydroxyl groups and one amino group include dialkanolamines, such as N-aliphatic-dialkanolamines.

In one embodiment, the N-aliphatic-dialkanolamine is an N-alkyl-diethanolamine having up to 20 carbon atoms. Illustrative compounds include, but are not limited to, N-methyl-diethanolamine, N-ethyl-diethanolamine, N-propyl-diethanolamine, N-nonyl-diethanolamine, N-decyl-diethanolamine, N-undecyl-diethanolamine, N-dodecyl-diethanolamine, N-tridecyl-diethanolamine, N-tetradecyl-diethanolamine, N-pentadecyl-diethanolamine, N-hexadecyl-diethanolamine and N-dodecyl-diethanol-N-tricosyl-diethanol amine.

In some cases, N-alkenyl-diethanolamines may be utilized. Illustrative N-alkenyl-diethanolamines include, but are not limited to, N-hexenyl-diethanolamine, N-heptenyl-diethanolamine, N-octenyl-diethanolamine, N-undecenyl-diethanolamine, N-dodecenyl-diethanolamine, N-tridecenyl-diethanolamine, N-tetradecenyl-diethanolamine, N-pentadecenyl-diethanolamine, N-hexadecenyl-diethanolamine, N-heptadecenyl-diethanolamine, N-octadecenyl-diethanolamine, N-nonadecenyl-diethanolamine and N-eicosenyl-diethanolamine.

In embodiments where the alkanolamine contains at least one hydroxyl group and two amino groups, the alkanolamine may be an aminoalkyl alkanolamine. The aminoalkyl alkanolamine may have from about four to about 20 carbon atoms. Illustrative compounds include, but are not limited to, aminoethylethanolamine, aminoethylpropanolamine, aminoethylbutanolamine, aminoethylpentanolamine, aminoethylhexanolamine, aminopropylethanolamine, aminopropylpropanolamine, aminopropylbutanolamine, aminopropylpentanolamine, aminopropylhexanolamine, aminobutylethanolamine, aminobutylpropanolamine, aminobutylbutanolamine, aminobutylpentanolamine, aminobutylhexanolamine, aminopentylethanolamine, aminopentylpropanolamine, aminopentylbutanolamine, aminopentylpentanolamine, aminopentylhexanolamine, aminohexylethanolamine, aminohexylpropanolamine, aminohexylbutanolamine, aminohexylpentanolamine, and aminohexylhexanolamine.

In another embodiment, the second amine is a polyalkyleneamine selected from a polyethyleneamine, a polypropyleneamine and a mixture thereof. Examples of polyethyleneamine's include, but are not limited to, ethylenediamine (EDA), di ethylenetriamine (DETA), triethylenediamine (TEDA), triethylenetetramine (TETA), tetraethylenepentamine (TEPA), pentaethylenehexamine, ethyleneamine mixtures, such as mixtures of ethyleneamine oligomers having an average molecular weight of about 250-500, and other mixtures thereof. Polypropyleneamine's include, but are not limited to, propylenediamine, dipropylenetriamine, tripropylenetetramine and other higher polypropyleneamines.

In some embodiments, the molecular weight or average molecular weight of the polyalkyleneamine is from about 50 to about 1000 or from about 100 to about 500, or from about 200 to about 500.

According to another embodiment, the second amine is the compound having the formula $R_4-(CH_2)_d-NH_2$ where $R_4$ is a piperazino group or a morpholino group and d is an integer from 0 to about 10 or from 1 to about 8 or from 1 to about 6 or from 1 to about 4 or from 1 to about 3.

In still yet another embodiment, the second amine is the compound having the formula a compound having the formula

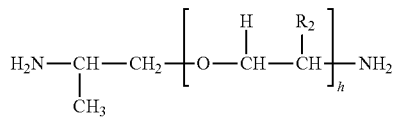

where h is an integer from about 2.5 to about 6.5. Examples of such compounds include JEFFAMINE® D230 and D240.

In one particular embodiment, the clay stabilizing agent includes: (a) about 0.01% by weight to about 17.5% by weight, based on the total weight of the clay stabilizing agent, of the unhindered primary amine and (b) at least about 82.5% by weight, based on the total weight of the clay stabilizing agent, of the second amine. In another embodiment, the clay stabilizing agent includes: (a) about 0.1% by weight to about 15% by weight, based on the total weight of the clay stabilizing agent, of the unhindered primary amine and (b) at least about 85% by weight, based on the total weight of the clay stabilizing agent, of the second amine. In yet another embodiment, the clay stabilizing agent includes: (a) about 0.5% b weight to about 12.5% by weight, based on the total weight of the clay stabilizing agent, of the unhindered primary amine and (b) at least about 87.5% by weight, based on the total weight of the clay stabilizing agent, of the second amine. In another embodiment, the clay stabilizing agent includes: (a) about 1% by weight to about 10% by weight, based on the total weight of the clay stabilizing agent, of the unhindered primary amine and (b) at least about 90% by weight, based on the total weight of the clay stabilizing agent, of the second amine. In another embodiment, the clay stabilizing agent includes: (a) about 1.5% by weight to about 7.5% by weight, based on the total weight of the clay stabilizing agent, of the unhindered primary amine and (b) at least about 92.5% by weight, based on the total weight of the clay stabilizing agent, of the second amine. In yet another embodiment, the clay stabilizing agent includes: (a) about 2% by weight to about 5% by weight, based on the total weight of the clay stabilizing agent, of the unhindered primary amine and (b) at least about 95% by weight, based on the total weight of the clay stabilizing agent, of the second amine.

Generally, the clay stabilizing agent may be present in the water-based well treatment fluid in an amount sufficient to reduce either or both of surface hydration based swelling and/or osmotic based swelling of clay subterranean materials. The exact amount of the clay stabilizing agent present in a particular water-based well treatment fluid may be determined by a trial and error method of testing the combination of water-based well treatment fluid and clay formation encountered. In one embodiment, the amount of clay stabilizing agent of the present disclosure used in the water-based well treatment fluids ranges from about 1 to about 20 pounds per barrel (lbs/bbl or ppb) of water-based well treatment fluid. In another embodiment, the amount of clay stabilizing agent present in the water-based well treatment fluid ranges from about 2 to about 18 ppb of water-based well treatment fluid. In still yet another embodiment, the water-based well treatment fluid may include about 0.001% by weight to about 10% by weight, based on the total weight of the water-based well treatment fluid, of the clay stabilizing agent. In another embodiment, the water-based well treatment fluid may include about 0.1% by weight to about 8% by weight, or about 0.5% by weight to about 6% by weight, or about 1% by weight to about 4% by weight, based on the total weight of the water-based well treatment fluid, of the clay stabilizing agent.

In another embodiment, the water-based well treatment fluid may include a weighting material. The weighting material may increase the density of the fluid in order to prevent kick-backs and blow-outs. Suitable weighting materials include any type of weighting material that is in solid form, particulate form, suspended in solution, or dissolved in the aqueous continuous phase. In one embodiment, the weighting material is barium sulfate, barite, hematite, iron oxide, calcium carbonate, magnesium carbonate, an organic salt, an inorganic salt or mixtures thereof. The amount of weighting material present in the water-based well treatment fluid is an amount effective to prevent kick-backs and blow-outs, which amount changes according to the nature of the formation under treatment operations. In one particular embodiment, the weighting material is included in the water-based well treatment fluid at a level of less than 800 ppb, for example, from about 5 ppb to about 750 ppb or from about 10 ppb to about 700 ppb of water-based well treatment fluid.

Additionally, an acid or base maybe added to the water-based well treatment fluid of the present disclosure for handling purposes or pH adjustment. Any suitable acid or base may be used. In one embodiment, the acid or base should not form a salt that is not soluble. In some embodiments, the water-based well treatment fluid can be neutralized to a pH of approximately pH 9 to 11. Examples of acids or bases include, but are not limited to, glacial acetic acid and sodium hydroxide.

The water-based well treatment fluid of the present disclosure may further comprise an additive, such as gelling materials, thinners, and fluid loss control agents. Typical gelling materials include, but are not limited to, bentonite, sepiolite clay, attapulgite clay, anionic high-molecular weight polymer and biopolymers. Typical thinners include, but are not limited to, lignosulfonates modified lignosulfonates, polyphosphates, tannins, and low molecular weight polyacrylates. Thinners are added to a drilling fluid to reduce flow resistance, control gelation tendencies, reduce filtration and filter cake thickness, counteract the effects of salts, minimize the effects of water on the formations drilled, emulsify the oil in water, and stabilize the mud properties at elevated temperatures. Suitable fluid control agents include, but are not limited to, synthetic organic polymers, biopolymers, and mixtures thereof. The fluid control agents may also comprise modified lignite, polymers, and modified starches and celluloses. Ideally, the additives should be selected to have low toxicity and to be compatible with common drilling fluid additives, such as polyanionic carboxymethylcellulose (PAC or CMC), polyacrylates, partially-hydrolyzed polyacrylamides (PHPA), lignosulfonates, xanthan gum and mixtures of these.

The water-based well treatment fluids of the present disclosure may further contain an additional additive, such as an encapsulating agent. Encapsulating agents help improve the removal of cuttings with less dispersion of the cuttings into the drilling fluids. The encapsulating agents may be anionic, cationic or non-ionic in nature. Other additives may also be added to the water-based well treatment fluids of the present disclosure, including products such as lubricants, penetration rate enhancers, proppants, defoamers, corrosion inhibitors, loss circulation products, and other similar products known to those skilled in the art.

The clay stabilizing agent of the present disclosure and optional weighting material and optional additives may be admixed with the aqueous continuous phase to form the water-based well treatment fluid. Thus, in another embodiment, there is provided a method of making a water-based well treatment fluid including the step of admixing a clay stabilizing agent according to the present disclosure, optionally a weighting material and optional other additives with an aqueous continuous phase.

In another embodiment, there is provided a method of inhibiting the swelling and/or migration of clay subterranean materials encountered during the drilling of a subterranean formation. The method includes circulating in the subterranean formation a water-based well treatment fluid containing an aqueous continuous phase and the clay stabilizing agent of the present disclosure. In still another embodiment, there is provided a method for stabilizing a subterranean formation including the steps of contacting the subterranean formation with the water-based well treatment fluid of the present disclosure. Contacting the subterranean formation may be accomplished, for example, by providing the water-based well treatment fluid disclosed herein to the subterranean formation before, during or after hydraulic fracturing or drilling.

Clay subterranean materials which may be effectively treated with the water-based well treatment fluid may be of varying shapes, such as minute, plate-like, tube-like and/or fiber-like particles having an extremely large surface area. Examples include clay minerals of the montmorillonite (smectite) group such as montmorillonite, saponite, nontronite, hectorite and sauconite, the kaolin group such as kaolinite, nacrite, dickite, and halloysite, the hydrousmica group such as hydrobiotite, gluaconite, illite and bramallite, the chlorite group such as chlorite and chamosite, clay minerals not belonging to the above group such as vermiculite, attapulgite and sepiolite and mixed-layer varieties of such clay minerals and groups. Other mineral components may be further associated with the clay.

In another embodiment, the materials and method of inhibiting swelling and/or migration of clay subterranean materials and stabilizing the subterranean formation can be provided as a kit that includes a sufficient amount of the clay stabilizing agent of the present disclosure, optional weighting material and optional additives for on-site admixture with the aqueous continuous phase.

The result of stabilization of the subterranean formation with the water-based well treatment fluid described herein is that clay subterranean material particulates loosened from the subterranean formation by the process of removing a hydrocarbon product have reduced swell, have reduced subterranean migration, do not reduce the flow of the hydrocarbon product, and/or do not contaminate the hydrocarbon product. Without the water-based well treatment fluid, the clay subterranean materials can swell and/or migrate to inhibit or contaminate hydrocarbon production. The stabilization effect can be measured by comparing wells with and without the water-based well treatment fluid or comparing the flow rate of fluids (e.g. oil, water or natural gas) through samples from the subterranean formation with and without the water-based well treatment fluid.

Subterranean formations can be stabilized by contacting them with the water-based well treatment fluid. In one embodiment, clay subterranean materials swelling and/or fines migration can be reduced by contacting the subterranean formation with a water-based well treatment fluid comprising an aqueous continuous phase, the clay stabilizing agent of the present disclosure, optional weighting material and optional additives.

In another embodiment, a previously hydraulically fractured subterranean formation can be restabilized by contacting the hydraulically fractured subterranean formation with the water-based well treatment fluid of the present disclosure. The hydraulically fractured subterranean formation can be a hydraulically fractured subterranean formation, for example, that from which hydrocarbons have been extracted. Preferably, the hydraulically fractured subterranean formation is a formation having a mineral content that is predominantly clay, shale, sand, and/or a mixture thereof.

In still another embodiment, the water-based well treatment fluid can be used in a method of flushing a bore hole during drilling. The method includes applying the water-based well treatment fluid to a drill head during drilling of a subterranean formation.

In yet another embodiment, there is provided a method of extracting oil from an oil containing subterranean formation by providing through a first borehole, a pressurized water-based well treatment fluid of the present disclosure and recovering oil from the subterranean formation through a second borehole. Preferably, the subterranean formation was previously hydraulically fractured and oil was previously extracted.

In still yet another embodiment, there is provided a system that includes the water-based well treatment fluid of the present disclosure and a subterranean formation.

The present disclosure will now be further described with reference to the following non-limiting examples.

EXAMPLES

Examples 1-4. Preparation/Testing of Water-Based Well Treatment Fluids

Buffer solutions were prepared from sodium carbonate and sodium hydrogen carbonate having pH values of 9, 10 and 11. Each solution contained 0.4% by weight sodium carboxymethylcellulose and a sodium concentration of 0.232 M. 10.5 grams of 100% active clay stabilizing agent was diluted to 340 grams with each buffer solution, followed by re-adjustment to a pH of 9, 10 or 11 using either glacial acetic acid or 50% aq. NaOH. Solution weights were adjusted to 350 g to give 3% by weight solutions. Virgin shale rocks were obtained from Russia, broken and sieved to a 4.75-6.7 mm diameter (longest dimension) and dried at 95°-110° C. for 3 hours prior to use. These shale rocks were weighed and added to 400-ml stainless steel pressure vessels. The water-based well treatment fluids were added and the vessels were purged of air by pressurizing to 100 psig with nitrogen and evacuating to atmospheric pressure three successive times. The vessels, containing nitrogen at atmospheric pressure, were transferred to a rolling oven set to 90° C. and allowed to roll for 16 hours. The vessels were then immersed in baths containing tap water at room temperature and allowed to cool for 1.5 hours prior to opening. The contents were filtered through a 20-mesh screen and the solids remaining were washed with 5% by weight KCl prior to drying at 95°-110° C. for 3 hours. The dried shale pieces obtained were sifted through successive 8- and 20-mesh screens and the weights obtained were recorded as percentages of the initial weight of shale used in each experiment. The clay stabilizing agents used are identified in Table 1 below.

TABLE 1

Clay stabilizing agent compositions.

Description

Unhindered Primary Amine, A

| | |
|---|---|
| A1 | Hexamethylenediamine |
| A2 | SURFONIC ® MW-781 Amine (Butoxypropylamine) |

Second amine, B

| | |
|---|---|
| B1 | Aminoethyl ethanol amine |
| B2 | JEFFAMINE ® E-100 Amine (Polyethylene amine) |
| B3 | Mixture of second amines[1] |
| B4 | Mixture of second amines[2] |

[1]Mixture includes ethyleneamines, ethanolamines, morpholino-functional amines and alcohols, and water.
[2]Mixture includes JEFFAMINE ® D230 and D400 amines.

Water-based well treatment fluids Ex. 1-4 were prepared by blending 20 parts A1 with 80 parts B1-4 individually, respectively. The measured performance of each, Ex. (meas), was compared to that expected based on simple linear combinations of the performances of each component, Ex. (calc) (e.g. comparison of calculated, Ex. 1(calc), to measured, Ex. 1(meas), values for which the former were determined as linear combinations of component values A and B. Wt. % surviving shale of 20- and 8-mesh sizes following testing at pH 9, 10 and 11). The results are given in Table 2 below.

TABLE 2

Performance of Water-based Well Treatment Fluids.

| | pH 9 | | pH 10 | | pH 11 | |
|---|---|---|---|---|---|---|
| | 20-mesh (%) | 8-mesh (%) | 20-mesh (%) | 8-mesh (%) | 20-mesh (%) | 8-mesh (%) |
| Ex. 1 = 0.2A1 + 0.8B1 | | | | | | |
| A1 | 46.99 | 12.13 | 59.90 | 20.28 | 67.59 | 42.71 |
| B1 | 10.87 | 6.51 | 6.97 | 3.35 | 8.21 | 3.20 |
| Ex. 1(calc) | 18.09 | 7.63 | 17.56 | 6.73 | 20.09 | 11.10 |
| Ex. 1(meas) | 65.28 | 31.67 | 62.97 | 25.40 | 42.50 | 10.90 |
| Ex. 2 = 0.2A1 + 0.8B2 | | | | | | |
| A1 | 46.99 | 12.13 | 59.90 | 20.28 | 67.59 | 42.71 |
| B2 | 71.36 | 25.70 | 73.36 | 31.43 | 28.11 | 13.01 |
| Ex. 2(calc) | 66.49 | 22.99 | 70.67 | 29.20 | 36.01 | 18.95 |
| Ex. 2(meas) | 73.75 | 38.90 | 70.09 | 34.15 | 60.38 | 35.58 |
| Ex. 3 = 0.2A1 + 0.8B3 | | | | | | |
| A1 | 46.99 | 12.13 | 59.90 | 20.28 | 67.59 | 42.71 |
| B3 | 62.85 | 36.61 | 45.32 | 29.40 | 12.56 | 8.14 |
| Ex. 3(calc) | 59.67 | 31.71 | 48.23 | 27.58 | 23.57 | 15.05 |
| Ex. 3(meas) | 50.57 | 26.46 | 70.43 | 39.96 | 45.70 | 17.72 |

TABLE 2-continued

Performance of Water-based Well Treatment Fluids.

| | pH 9 | | pH 10 | | pH 11 | |
|---|---|---|---|---|---|---|
| | 20-mesh (%) | 8-mesh (%) | 20-mesh (%) | 8-mesh (%) | 20-mesh (%) | 8-mesh (%) |
| Ex. 4 = 0.2A1 + 0.8B4 | | | | | | |
| A1 | 46.99 | 12.13 | 59.90 | 20.28 | 67.59 | 42.71 |
| B4 | 67.62 | 28.88 | 83.09 | 44.92 | 16.52 | 10.66 |
| Ex. 4(calc) | 63.49 | 25.53 | 78.45 | 39.99 | 26.73 | 17.07 |
| Ex. 4(meas) | 76.43 | 35.69 | 71.14 | 37.02 | 49.27 | 26.54 |

From the results above, it can be seen that potential synergies, defined herein as instances for which the measured values are at least 5% greater than calculated, were identified for all Ex. fluids for at least two of the three pH values for which data were obtained.

Examples 5-7. Preparation/Testing of Water-Based Well Treatment Fluids

In another series of experiments similar to those above, water-based well treatment fluids Ex. 5-7 were prepared by blending 5 wt. %, 10 wt. % and 20 wt. % A2 in B2 and tested. The results are given in Table 3.

TABLE 3

Performance of Water-based Well Treatment Fluids.

| | pH 9 | | pH 10 | | pH 11 | |
|---|---|---|---|---|---|---|
| | 20-mesh (%) | 8-mesh (%) | 20-mesh (%) | 8-mesh (%) | 20-mesh (%) | 8-mesh (%) |
| A2 | 80.90 | 51.23 | 85.89 | 71.67 | 18.10 | 12.55 |
| B2 | 71.36 | 25.70 | 73.36 | 31.43 | 28.11 | 13.01 |
| Ex. 5 = 0.2A1 + 0.8B2 | | | | | | |
| Ex. 5(calc) | 73.27 | 30.81 | 75.87 | 39.48 | 26.11 | 12.92 |
| Ex. 5(meas) | 79.42 | 42.09 | 86.70 | 66.89 | 13.89 | 6.27 |
| Ex. 6 = 0.1A1 + 0.9B2 | | | | | | |
| Ex. 6(calc) | 72.31 | 28.25 | 74.61 | 35.45 | 27.11 | 12.96 |
| Ex. 6(meas) | 83.44 | 47.22 | 89.24 | 62.96 | 13.76 | 7.36 |
| Ex. 7 = 0.05A1 + 0.95B2 | | | | | | |
| Ex. 7(calc) | 71.84 | 26.98 | 73.99 | 33.44 | 27.61 | 12.99 |
| Ex. 7(meas) | 87.89 | 50.93 | 90.11 | 63.90 | 23.34 | 11.87 |

Again, potential synergies were identified for all Ex. fluids at pH 9 and 10. Notably, the performance of Ex. 7, which contains only 5% by weight of the unhindered primary amine, performs as well as Ex. 5, which contains 20% by weight of the unhindered primary amine, within experimental error.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A water-based well treatment fluid for the treatment of a subterranean formation comprising:
   (A) an aqueous continuous phase and
   (B) a clay stabilizing agent including:
      (a) about 0.001% by weight to about 20% by weight, based on the total weight of the clay stabilizing agent, of an unhindered primary amine, wherein the unhindered primary amine is butoxypropylamine; and (b) a second amine which is a mixture of polyethyleneamines, wherein the average molecular weight of the mixture of polyethyleneamines is from about 200 to about 500.

2. The water-based well treatment fluid of claim 1, wherein the aqueous continuous phase is selected from fresh water.

3. The water-based well treatment fluid of claim 1, further comprising a weighting material.

4. The water-based well treatment fluid of claim 1, wherein the clay stabilizing agent includes:

(a) about 0.01% by weight to about 17.5% by weight, based on the total weight of the clay stabilizing agent, of the unhindered primary amine and (b) at least about 82.5% by weight, based on the total weight of the clay stabilizing agent, of the second amine.

5. The water-based well treatment fluid of claim 1, wherein the clay stabilizing agent includes:

(a) about 1% by weight to about 10% by weight, based on the total weight of the clay stabilizing agent, of the unhindered primary amine and (b) at least about 90% by weight, based on the total weight of the clay stabilizing agent, of the second amine.

6. A process of making a water-based well treatment fluid comprising admixing a clay stabilizing agent comprising:

(a) about 0.001% by weight to about 20% by weight, based on the total weight of the clay stabilizing agent, of an unhindered primary amine, wherein the unhindered primary amine is butoxypropylamine; and (b) a second amine which is a mixture of polyethyleneamines in an aqueous continuous phase, wherein the average molecular weight of the mixture of polyethyleneamines is from about 200 to about 500.

7. A method of inhibiting the swelling and/or migration of clay subterranean materials encountered during the drilling of a subterranean formation comprising circulating in the subterranean formation the water-based well treatment fluid of claim 1.

8. A method of extracting oil from an oil containing subterranean formation comprising providing through a first borehole, a pressurized water-based well treatment fluid of claim 1 and recovering oil from the subterranean formation through a second borehole.

\* \* \* \* \*